Patented Feb. 10, 1942

2,272,847

UNITED STATES PATENT OFFICE 2,272,847

MOLDING OF ORGANIC PLASTICS

Maurice L. Macht, Jersey City, N. J., assignor to E. I. du Pont de Nemours & Company, Wilmington, Del., a corporation of Delaware No Drawing. Application July 23, 1940, Serial No. 346,998

3 Claims. (Cl. 18—47)

This invention relates to the molding of plastics and, more particularly, to the prevention of their adhesion to metal molds.

In molding by the application of heat and pressure in metal molds, any tendency of a plastic to adhere to the metal of the mold delays the operation and damages the molded articles. It is, accordingly, almost a universal practice to provide against such adhesion by the use of mold lubricants, which may serve also to facilitate molding by reducing skin friction against the mold during the shaping of the mass.

Substances heretofore proposed as lubricants include waxes, oils, fatty acids, and soaps. In general, any of these may be used in either of two ways, i. e., as a coating upon the surface of the mold or as an ingredient of the material to be molded. Lubricants so used are referred to hereinafter as "external" and "internal" lubricants, respectively.

The use of an external lubricant has, for example, for many years been the practice in the swaging and die-pressing of blanks of the nitrocellulose plastics; the surface of the metal mold is coated with a lubricant, such as soap, by applying to the hot surface of the mold an aqueous solution thereof.

Quite analogous to this is the use of an external lubricant in the operation of press-polishing in which plastic sheeting is straightened and surfaced by being hot-pressed between metal plates adapted to yield the surface finish desired. This operation is fundamentally a molding operation and, as such, is to be regarded as within the scope of the objects of the present invention and of the claims made thereto.

With most plastics, particularly with those furnished to the molder in granular form, it has become the more common practice to use an internal lubricant, i. e., to incorporate the lubricant into the plastic during the compounding of the latter. Molding compounds provided with an internal lubricant which prevents adhesion to a large majority of the metal molds in which they are used, will, however, adhere to an occasional difficult mold as a result of its design, its material, or its finish.

In such case it becomes necessary to apply an external lubricant in addition to or instead of the internal lubricant.

It is essential that a lubricant shall not corrode the metal of the mold and that, when used in amounts adequate to provide the desired lubricating effect, it shall not impair the surface finish or the transparency or color of the molded article and that its presence shall not cause visible or tangible smear or greasiness.

Further features desirable in an external lubricant are ease and speed of application, and durability of effect. From the standpoint of ease of application, the lubricant should either be liquid or be soluble or emulsifiable in an inexpensive volatile liquid and thus applicable in the latter as a vehicle. The application may be made by brush, by cloth, or by spray. The use of a liquid vehicle is helpful in avoiding too heavy a coat of lubricant; the vehicle is evaporated rapidly from the hot surface of the mold. It is important in commercial operations that the effect of one application of the external lubricant to the mold be as prolonged as possible so that it is not necessary to consume time in making frequent applications.

An object of the present invention is to provide an improved and economical external mold lubricant adapted for use in the molding of organic plastics generally by heat and pressure. A further object is to provide such an external mold lubricant which is characterized by a more prolonged lubricating effect than the external mold lubricants heretofore used. A still further object is to provide such a lubricant which is free from damaging effect upon the mold or upon the desirable properties of the molded article and which may be readily and economically applied to a mold. Other objects of the invention will be apparent from the description given hereinafter.

The above objects are accomplished according to the present invention by the use, as an organic plastics external mold lubricant, of di-substituted esters of phosphoric acid with aliphatic alcohols of from 12–18 carbon atoms, inclusive. While this group of phosphoric esters are all adapted for use as external mold lubricants, it is preferred to use either didodecyl phosphate or the di-substituted ester of phosphoric acid with a commercial mixture of saturated aliphatic alcohols in which dodecyl alcohol predominates, such mixture of alcohols being sold under the trade name of "Lorol" and containing, in addition to dodecyl alcohol, smaller proportions of other saturated aliphatic alcohols containing 12–18 carbon atoms, inclusive. Both didodecyl phosphate and di-"Lorol" phosphate are commercially available.

The mold lubricants of the present invention may be applied to the surface of the mold by any convenient method which will ensure a proper covering of the surface and at the same time avoid the deposition of an excess. It is preferred to use the lubricant in the form of a very dilute solution in a convenient volatile solvent, such as acetone, ethyl alcohol, or benzol, or in the form of a dilute emulsion in water. An entirely adequate coating of the lubricant is deposited by spraying the surface of the mold lightly with, for example, a solution in acetone, containing 0.25 per cent of the lubricant. Uniformity of coating is promoted by having the mold surface already heated before the solution is applied so that the volatile ingredient is driven off before the solution has much opportunity to run off vertical surfaces.

If the method of application is such that a more generous quantity of solution is applied, e. g., when the application is made by means of a soft brush, then the concentration of the lubricant in the solvent may be correspondingly diminished, e. g., to as low as 0.01 per cent. The optimum strength of the solution to be used is readily adjusted by actual trial to the type of surface in question, the method of application, and the difficulty of the specific problem of lubrication. With the lubricants of the present invention, a lubricating effect adequate to meet any reasonable commercial problem is obtainable without the need of using so much lubricant as to deposit a visible or tangible excess upon the molded article.

Aqueous emulsions of these lubricants can be prepared without difficulty in a colloid mill, or equivalent apparatus, with or without the assistance of dispersing agents. For example, an emulsion of 0.5 part of dilauryl phosphate in 100 parts of water is readily prepared in this manner and is stable for at least several days.

The use of the external lubricants of the present invention will ordinarily, but not necessarily, be limited to molding in molds of particularly difficult design, such as finely threaded telephone earpiece caps, and to molds in which actual adhesion is supplemented by a pseudo-adhesion resulting from roughness of surface.

The external lubricants herein considered may be used with organic plastics generally. The plastics with which these lubricants may be used with particularly good effect, are those having bases of phenol-formaldehyde resin, urea-formaldehyde resin, polystyrene, polymethyl methacrylate and its homologues, polyvinyl esters and their derivatives, and similar ethenoid resins.

These lubricants may also be employed with good effect with the above mentioned plastics as internal lubricants, the proportion of lubricant used being comparable with that conventionally used in the art with heretofore known lubricants although the proportion may be reduced since the herein considered lubricants are, in general, more effective as internal lubricants than those used heretofore.

The present invention resides in part in the discovery that these di-substituted phosphoric esters are unique in their durability of effect as external mold lubricants as well as possessing the other properties requisite in a commercially acceptable mold lubricant. As compared with external mold lubricants heretofore used, the present lubricants show most unexpected increase in their durability of effect amounting to an increase in durability in the neighborhood of 100% with respect to molds presenting some difficulty in the release of the molded article.

To illustrate the durability of lubricating effect of these phosphoric esters, a mold known to be very difficult in the release of the molded object was used in making moldings of polymethyl methacrylate containing no internal mold lubricant but using various eternal lubricants. In running the comparative tests, the mold was thoroughly cleaned, then coated with a lubricant, and molded parts were then made following a uniform and standard molding procedure. The mold was used without further application of lubricant until trouble was encountered in releasing the molded part from the mold. The following table gives the number of moldings that could be made using various external mold lubricants before trouble was encountered:

| Mold lubricant | Number of moldings |
| --- | --- |
| No lubricant | 0 |
| Aluminum palmitate | 0 |
| Paraffin | 0 |
| Monododecyl phthalate | 2 |
| Chlorinated paraffin wax | 2 |
| "Lorol" | 2 |
| Mixture of tetra- and pentachlor ethyl benzol | 3 |
| Pentadecanone-8 | 3 |
| Stearyl glycolate | 3 |
| Mixture of saturated aliphatic alcohols, stearyl predominating | 3 |
| Butyl stearate | 4 |
| Amine of "Lorol" | 4 |
| Sodium lauryl sulfate | 6 |
| Di-substituted ester of phosphoric acid and "Lorol" | 7 |
| Didodecyl phosphate | 8 |

The sodium lauryl sulfate, which exhibits a durability of lubricating effect almost as good as that of the lubricants of the present invention, is undesirable because of a tendency to leave visible smears upon molded articles.

To prevent the adhesion of sheeting of a base of synthetic resin to metal polishing plates, or to sheets of glass analogously used, the lubricants of the present invention are applied in a thin coat to the surfaces of such plates, on which they provide effective and durable external lubrication analogous to that which they provide in other molding operations. They are thus of utility in the finishing of sheetings of compositions which tend to adhere too readily to metal or glass, such as sheetings of base of polyvinyl acetal resins.

It is practicable also to utilize the lubricants of the present invention by applying them as a coating to a molding compound in granular form. Thus a molding compound of ethenoid resin in the form of tiny globules, resulting from polymerization in the form of droplets, or molding compounds of any of the known types of plastics in granular condition obtained by grinding of gross pieces, may be coated by being tumbled with the lubricant or by being sprayed with the lubricant distributed by solution or emulsion in a volatile liquid vehicle—preferably a non-solvent toward the plastic—which is subsequently evaporated. This method does not constitute thoroughgoing internal lubrication, since the distribution of the lubricant upon the surfaces of relatively coarse particles falls considerably short of the homogeneity of distribution which characterizes true internal lubrication. On the other hand it obviously provides an immediate film of lubricant between the molding compound and the mold, and thus partakes of the characteristics of external lubrication.

The present invention yields improvement in molding technique and in particular provides external lubricants which, in addition to meeting the ordinary requirements of lubricants so used, offer the distinct advantages of unique and unprecedented durability of effect.

As many apparently widely different embodiments of this invention may be made without departing from the spirit and scope thereof, it is to be understood that the invention is not limited to the specific embodiments thereof except as defined in the appended claims.

I claim:

1. An organic plastics external mold lubricant comprising a di-substituted ester of phosphoric acid with an aliphatic alcohol containing 12-18 carbon atoms, inclusive.

2. An organic plastics external mold lubricant comprising a di-substituted ester of phosphoric acid with a mixture of saturated aliphatic alcohols containing 12-18 carbon atoms, inclusive, in which dodecyl alcohol predominates.

3. An organic plastics external mold lubricant comprising didodecyl phosphate.

MAURICE L. MACHT.